United States Patent [19]

Ueda et al.

[11] Patent Number: 5,082,732
[45] Date of Patent: Jan. 21, 1992

[54] RUBBER PARTICLES FOR RESIN REINFORCEMENT AND REINFORCED RESIN COMPOSITION

[75] Inventors: Eiji Ueda; Noriaki Umeda, both of Kurashiki, Japan

[73] Assignee: Asahi Kasei Kogyo Kabushiki Kaisha, Osaka, Japan

[21] Appl. No.: 367,142

[22] Filed: Jun. 16, 1989

[30] Foreign Application Priority Data

Jun. 21, 1988 [JP] Japan .................. 63-151210

[51] Int. Cl.$^5$ ................ B32B 5/16; B32B 27/08; C08L 53/02
[52] U.S. Cl. ................ 428/402; 428/407; 525/92
[58] Field of Search ................ 428/407, 402; 525/902, 525/267

[56] References Cited

U.S. PATENT DOCUMENTS 3,359,130 12/1967 Goldman .................. 428/407

FOREIGN PATENT DOCUMENTS 2725663 12/1977 Fed. Rep. of Germany .
63-142056 6/1988 Japan .

OTHER PUBLICATIONS

Abstract Reyler 07-18-91.

Primary Examiner—Jacob Ziegler
Attorney, Agent, or Firm—Birch, Stewart, Kolasch & Birch

[57] ABSTRACT

Rubber particles comprising a hydrogenated block copolymer of a conjugated diene and a vinyl aromatic compound, said particles having a glass transition temperature of $-30°$ C. or less, a gel content of at least 10%, an average particle size of 0.01 to 5.0 $\mu$m, and a micro-phase separating structure having hard segments and soft segments, wherein hard segments and soft segments are alternately laminated together in the form of concentric multilayers, are useful in reinforcing resin compositions. A particular reinforced resin composition is comprised of a matrix resin having a glass transition temperature of at least 0° C. and 1 to 60% by weight of the above defined rubber particles dispersed in the matrix resin. The rubber particles have a great reinforcing effect on the matrix resin and resin compositions reinforced with these rubber particles are characterized with superior weather resistance, heat stability and impact resistance properties.

20 Claims, 1 Drawing Sheet

FIG.1A ×10⁵
FIG.1B ×10⁵
FIG.1C ×10⁵

RUBBER PARTICLES FOR RESIN REINFORCEMENT AND REINFORCED RESIN COMPOSITION

BACKGROUND OF THE INVENTION

1. Field of the Invention

The present invention relates to rubber particles for resin reinforcement which are superior in weather resistance and heat stability and to a reinforced resin composition containing these particles.

2. Description of the Prior Art

A resin reinforced with rubber, viz. a high impact resin having superior mechanical strength, is used in a wide variety of application fields.

In order to reinforce a resin effectively with rubber, it is necessary, as represented by ABS resin and HIPS (high impact polystyrene) resin, that the rubber in a particle form be controlled within a specific range of particle sizes and cross-linked moderately as well as being made compatible with the matrix resin by grafting a resin ingredient identical or compatible with the matrix resin onto the rubber so as to disperse the particles of the rubber uniformly in the matrix resin.

Rubbers of the polybutadiene family (unsaturated rubbers), which are easy to cross-link and have a high graft receptive activity, are used extensively as rubbers suitable for the above purpose.

However, the rubbers of this type, because of having unsaturated bonds contained therein, have the drawback of inferior heat stability and weather resistance. Hence these rubbers exhibit deterioration in physical properties during high-temperature processing and the practical use of these rubbers for such purposes is restricted.

The addition of antioxidant and/or ultraviolet absorber to a resin is generally considered for the improvement of its heat stability and/or weather resistance. However, this addition causes a reduction in impact resistance as well as a rise in cost, and there is a question concerning the permanence of its effect.

On the other hand, attempts have been made to reinforce resins with a rubber which does not have a polymer grafted thereto. Japanese Patent Application Kokoku No. 61-46493 discloses a method comprising cross-linking a rubber of a styrene-butadiene block copolymer (SB block copolymer) type, and forming the cross-linked rubber into particles, which are then used to improve the impact strength of aromatic monovinylidene polymers. This method, however, still leaves problems in that the rubber used in this method still contains double bonds, and consequently is inferior in heat stability and weather resistance, and the effect of the improvement of the impact resistance is limited.

SUMMARY OF THE INVENTION

As a result of intensive studies aiming at solving the above noted problems, it has been found that a rubber-reinforced resin composition superior in weather resistance and heat stability can be obtained by transforming a hydrogenated block copolymer rubber into particles, cross-linking and using these cross-linked rubber particles to reinforce the resin composition.

An object of the present invention is to provide rubber particles for resin reinforcing which does not require a polymer grafted thereto in order to enhance the compatibility of said particles with matrix resins and have good balance among weather resistance, heat stability and impact resistance properties.

Another object of the present invention is to provide a novel resin composition containing said reinforcing rubber particles.

Other objects and advantages of the present invention will be apparent from the following description.

The present invention relates particularly to (i) rubber particles comprising a hydrogenated block copolymer of a conjugated diene and a vinyl aromatic compound, said particles having a glass transition temperature (Tg) of $-30°$ C. or less, a gel content of at least 10%, an average particle size of from 0.01 to 5.0 $\mu$m, and a micro-phase separating structure (a structure constructed of separated microphases) having hard segments and soft segments, wherein the hard segments and soft segments are alternately laminated together in the form of concentric multilayers, and (ii) a reinforced resin composition comprising a matrix resin having a Tg of at least $0°$ C. and from 1 to 60% by weight of the above defined rubber particles dispersed in the matrix resin.

BRIEF DESCRIPTION OF THE DRAWING

FIG. 1 is an electron photomicrograph showing cross-sections of rubber particles according to the present invention which have a micro-phase separating structure having hard segments and soft segments, wherein the hard segments and soft segments are alternately laminated together in the form of concentric multilayers. FIG. 1-($a$) shows an intermittent, concentric structure of the rubber particles, FIG. 1-($b$) shows a polyhedral, concentric structure of the same, and FIG. 1-($c$) shows a continuous, concentric structure.

DETAILED DESCRIPTION OF PREFERRED EMBODIMENT OF THE INVENTION

The micro-phase separating structure defines a state wherein a group of hard segments and a group of soft segments, both the groups being originally incompatible with each other, form separate phases of the respective groups having sizes in the order of molecular chain. The hard segments have a relatively high Tg, more specifically, a Tg of at least $25°$ C., and the soft segments have a relatively low Tg, more specifically, a Tg of less than $25°$ C. For example, a hydrogenated block SBR has hard segments which consist of polystyrene and soft segments which consists of hydrogenated polybutadiene.

The micro-phase separating structure having hard segments and soft segments, wherein the hard segments and soft segments are alternately laminated together in the form of concentric multilayers (hereinafter such a structure is referred to as a micro-phase separating concentric multilayered structure) defines a particle structure constructed of hard segments and soft segments, both types of segments being alternately laminated together so as to surround the core of the particle. The shape of this particle may be any of spherical, ellipsoidal, and polyhedral shapes, with the spherical shape being preferred. The segment layers of particle may be either continuous or intermittent, preferably continuous. The most desirable rubber particle is spherical and constructed of continuous layers.

FIG. 1 shows cross sections of rubber particles having a micro-phase separating concentric multilayered structure. Particularly, FIG. 1 is an electron photomicrograph of cross sections obtained by slicing rubber particles and dyeing the sliced pieces. Of the rubber particle structures shown in FIGS. 1(a), (b) and (c), those shown in FIGS. 1(b) and (c) are preferred for resin reinforcing purposes and particularly preferred is the one shown in FIG. 1(c).

The micro-phase separating structure of hydrogenated block copolymer rubber particles depends upon the molecular weight of the block copolymer, the proportion of hard segment/soft segment in the block copolymer and the structure or mode of the block. As an example, hydrogenated butadiene-styrene block copolymer rubber particles which would be useful for forming the micro-phase separating concentric multilayered structure, are required to have a number average molecular weight in a range of from 40,000 to 100,000, a polystyrene segments (hard segments) proportion of from 30% to 70% by weight, preferably from 40% to 60% by weight, and a block structure which is a triblock type or tetrablock type, preferably a tetrablock type. When the structure of block is of diblock type, the rubber particle will not form the micro-phase separating concentric multilayered structure shown in FIG. 1.

The rubber particles used in the present invention are comprised of a hydrogenated block copolymer having a Tg of −30° C. or less. The hydrogenated block copolymer consists of polymer blocks constituted mainly of the polymer of a vinyl aromatic compound (hereinafter these blocks are referred to as A blocks) and polymer blocks constituted mainly of a hydrogenated polymer of a conjugated diene (hereinafter these blocks are referred to as B blocks).

The block copolymer molecule may be comprised of linear, branched or radial structures. Examples of the block structure are as follows:
A-B (diblock structure),
A-B-A (triblock structure) and
A-B-A-B (tetrablock structure),
wherein A and B may have the same or different micro structures and/or molecular weights.

Suitable vinyl aromatic compounds for the monomer constituting the A block include styrene, α-methylstyrene, vinyl toluene and p-tert-butylstyrene, of which the preferred is styrene. These monomers may be used alone or in combination.

The amount of the vinyl aromatic compound is in a range of from 30 to 70% by weight.

Suitable conjugated dienes for the monomer constituting the B block before the hydrogenation include 1,3-butadiene, isoprene, 1,3-pentadiene and 2,3-dimethyl-1,3-butadiene, of which the preferred are 1,3-butadiene and isoprene. These monomer also may be used alone or in combination.

Of the suitable hydrogenated block copolymer rubbers, the ones which are preferred are a hydrogenated, styrene-butadiene block copolymer rubber (hereinafter referred to as a hydrogenated block SBR) and a hydrogenated, styrene-isoprene block copolymer rubber.

The functional groups of these hydrogenated block copolymers may also be modified with a chemical such as maleic anhydride or glycidyl methacrylate.

Not only completely-hydrogenated but also partly-hydrogenated rubbers can be used in the present invention, wherein the degree of hydrogenation is desirably at least 30%, preferably at least 80%, since less-hydrogenated rubbers have undesirably low weather resistance and heat stability.

Rubber particles having 10% or more of gel content are usable in the present invention. When the gel content is less than 10%, such rubber particles deform during molding, which would remarkably impair the appearance of molded articles and additionally, the impact resistance thereof would be insufficient. Preferably the gel content is in a range of from 40 to 95%. Rubber particles with gel contents within this range provide good appearance and sufficient impact resistance.

The average particle size of the rubber particles is in a range of from 0.01 to 5.0 $\mu$m. When the average particle size is less than 0.01 $\mu$m, the development of craze is not sufficient to provide impact resistance and hence the molded articles will be inferior in mechanical strength. When the average particle size is more than 5.0 $\mu$m, the molded articles will not only be deteriorated in appearance but also will have inferior mechanical strength. The optimum average particle size of rubber particles is from 0.1 to 2.0 $\mu$m, depending upon the matrix resin used and the property thereof to be improved. In general, rubber particles having an average particle size in the above defined range provide molded articles which are superior in appearance and impact resistance, and acquire practical value. Preferred average particle sizes of rubber particles are from 0.1 to 1.0 $\mu$m.

Resins having glass transition temperatures of at least 0° C. can be used as matrix resins for producing reinforced resin compositions according to the present invention. The incorporation of the rubber particles of the present invention into such matrix resins not only enhances the impact resistance but also improves other various properties thereof, the improved resin composition thus being adaptable for a wide variety of applications. Such matrix resins include polystyrene; styrene copolymers such as styrene-acrylonitrile copolymer and the like, polyphenylene ether; polyphenylene ether based polymers such as maleic acid-modified polyphenylene ether and the like; noncrystalline resins, such as polycarbonate, polymethyl methacrylate, polyacrylate, polyethersulfone, polyetherimide, polysulfone, silicone resins, fluororesins and the like; crystalline resins such as polyamides, polyesters, polyolefins, polyoxymethylene, polyphenylene sulfide, polyetheretherketone, polyimides and the like (all the above-mentioned resins are collectively referred to as thermoplastic resins); thermosetting resins such as epoxy resins, urethane resins, phenolic resins and the like. Resins particularly favorable as matrices are those compatible with the polymer constituting the outermost layers of particles of hydrogenated block copolymer rubber. For instance, when rubber particles used are formed of a hydrogenated block styrene-butadiene rubber, resins particularly suitable for use as matrices are polystyrene, styrene copolymers such as styrene-acrylo-nitrile copolymer and the like; polyphenylene ether; polyphenylene ether based polymers such as maleic acid-modified polyphenylene ether and the like; and blends of the above polymers.

Because the hydrogenated block copolymer rubber of the present invention has high heat stability, it is more suitable to blend this rubber with resins which are to be processed at high temperatures, particularly with resins of the polyphenylene ether type.

The blending ratio of rubber particles to the matrix resin is free to vary, though the desirable range of this ratio is from 1:99 to 60:40. As the proportion of the rubber particles increases, the effects of reinforcing of the rubber on the impact resistance and some other properties increase, but, a proportion of rubber particles exceeding 60% by weight lowers the stiffness and fluidity properties thereof. The range of rubber particle proportions is preferably from 3 to 40% by weight, particularly preferably from 5 to 20% by weight.

Taking the case of hydrogenated block SBR particles, the process for producing the rubber particles of the present invention is explained below.

First, a hydrogenated block SBR with a small amount of peroxide is dissolved in a solvent, an emulsifier and water are added to the resulting solution, and a high-speed shear force is applied to the resulting mixture to prepare a latex containing emulsified particles. In this operation, the viscosity of the rubber solution and that of the aqueous emulsifier solution are equalized to make the shear force effective, whereby the sizes of emulsified particles formed can be minimized and uniformed.

Second, the solvent is removed from the latex, and thereby forming a micro-phase separating structure of dispersed rubber particles which is constructed of polystyrene block portions and hydrogenated polybutadiene block portions and wherein the outermost shell of dispersed rubber particles consists substantially of a polystyrene phase. The removal of the solvent is necessarily continued until the amount of the remaining solvent becomes 0.1 part by weight or less per 1 part by weight of the rubber. In addition, it is necessary that the speed of the removal of the solvent be lowered to a speed lower than the speed of forming a segment structure of each component of the respective blocks.

Subsequently, the rubber is cross-linked. A preferred method for the cross-linking is to initially form a mixture by adding an organic peroxide to the rubber and heating the mixture so that the hydrogenated polybutadiene constituent may contain an intended amount of gel. Other applicable cross-linking methods are, for example, irradiation with γ-rays or the other radiations, and by the addition of a free radical forming agent. Thereafter, the colloidal dispersion of the latex is broken by an ordinary method such as by the addition of a salt to coagulate the rubber particles, which are then recovered and dried forming a powder, whereby the rubber particles of the present invention are produced. The thus obtained rubber particles have a micro-phase separating concentric multilayered structure, shown in FIG. 1.

These rubber particles can be compounded with various resins, preferably resins which are compatible with the rubber particles, by using an extruder or the like. By this means, reinforced resin compositions of the present invention are obtained. These reinforced resin compositions are characterized with excellent weather resistance, heat stability and impact resistance properties.

The present invention is explained more specifically below referring to the Examples and Comparative Examples.

1. Preparation and Evaluation of Rubber-Reinforced Thermoplastic Resin Compositions (1) When the thermoplastic resin is polyphenylene ether or polystyrene Evaluation method (i) Gel content: Rubber particles in a latex sample are coagulated, recovered and dried in vacuo, and thereafter 40 g of cyclohexane is added to 0.2 g of the dried rubber particles, precisely weighed, and the mixture is allowed to stand for 24 hours. The rubber particles remaining undissolved in the mixture are separated on a 100-mesh wire gauze, dried and weighed. The gel content is expressed by the percentage of this weight of rubber particles based on the weight of rubber particles sampled.

(ii) Impact strength (1/4 IZOD): Measured in accordance with ASTM D-256.

(iii) Surface gloss (GLOSS): Measured in accordance with ASTM Z-8741.

(iv) Peeling of rubber particle from matrix resin as caused by shock:

This was evaluated by observing the cracks in the surface of the molded specimens after the destruction thereof.

(v) Average particle size of the rubber: An electron microphotograph of a dyed latex sample is taken, and the sizes of hundreds of rubber particles in a visual field are measured. The above average particle size is expressed in terms of the number average value of the particle sizes measured.

EXAMPLE 1

Preparation of rubber particles 30 parts by weight (hereinafter, parts by weight are abbreviated as parts) of a hydrogenated block SBR (tetrablock structure, molecular weight 46,000, styrene content 30 wt %, degree of hydrogenation 99% or more and 2.0 parts of dicumyl peroxide (tradename PERCUMYL D made by Nippon Yushi Co., Ltd.) are dissolved in 70 parts of cyclohexane. Then 4 parts of potassium rosinate and 6 parts of deionized water are added to the resulting solution to mix homogeneously. Further, a high-speed shear force is exerted on this mixture in a homomixer to form an emulsion in dope form. To this emulsion in dope form is added 74 parts of deionized water to prepare a latex (hereinafter referred to as latex A).

Subsequently, cyclohexane is stripped from this latex A under a vacuum of 30 cmHg while maintaining the latex at 80° C., thereby reducing the solvent content from 70 parts (initial content) to 1 part.

Then the latex is maintained at 135° C. for 3 hours to cross-link the rubber. The thus obtained rubber particles are found to have an average particle size of about 0.25 μm, gel content of 83%, and Tg of −70° C. Further it is confirmed by observing cross-sections of these rubber particles through an electron microscope that the rubber particles, as shown in FIG. 1, have a microphase separating concentric multilayered structure formed of polystyrene block portions and hydrogenated polybutadiene block portions. In FIG. 1, white parts indicate hydrogenated polybutadiene segments and black parts indicate polystyrene segments.

1.0 part of a phenolic antioxidant is admixed with 100 parts of the above obtained latex, then the latex is subjected to salting-out by adding 1.0 part of aluminum sulfate, and the precipitate is recovered with dehydrating, and hot-air dried at 70° C., giving a homogeneous polymer powder.

10 parts of this powder is blended with 30 parts of a polystyrene resin (tradename STYLON 685 made by Asahi Chemical Industry Co., Ltd., viscosity in a toluene solution having a concentration of 10% and 25° C. was 26.5 c.p.) and 60 parts of a PPE resin ($\eta$ sp/c in a chloroform having a concentration 0.5 g/100 ml and at 30° C. is 0.57 dl/g). The blend is kneaded and pelletized through a twin-screw extruder at an extrusion temperature of 300° C. The obtained pellets are injection molded at a cylinder temperature of 285° C. and a mold temperature to form test specimens. Upon tests, these specimens exhibited excellent Izod impact strength and surface gloss and not the peeling of rubber particle from matrix resin as caused by shock.

Further, after exposure of some of the specimens in a Sunshine Weather-O-Meter at 83° C. for 50 hours, the Izod impact strength (⅛" bar) is measured, with the result that the retention of Izod impact strength by the exposed specimens was as high as 83% of the strength of the unexposed specimens. Thus the above obtained resin composition is found to be superior in weather resistance as well.

Results of these tests are shown in Table 1.

EXAMPLE 2

Rubber particles are prepared according to the procedure of Example 1 except that 1.8 parts of dicumyl peroxide is added instead of 2.0 parts thereof. The gel content of these rubber particles is 60%. A resin composition containing these rubber particles is prepared and its properties are evaluated, according also to the procedure of Example 1. Results of the evaluation are shown in Table 1.

EXAMPLE 3

Rubber particles are prepared according to the procedure of Example 1 except that 1.5 parts of dicumyl peroxide is added instead of 2.0 parts thereof. The gel content of these rubber particles is 25%. A resin composition containing these rubber particles is prepared and its properties are evaluated, according also to the procedure of Example 1. Results of the evaluation are shown in Table 1.

EXAMPLE 4

Rubber particles are prepared according to the procedure of Example 1 except that 2 parts of potassium rosinate and 8 parts of deionized water are added to form an emulsion in dope form. The obtained rubber particles are found to have an number average particle size of about 0.8 μm, gel content of 83%, and micro-phase separating concentric multilayered structure. A resin composition containing these rubber particles is prepared and its properties are evaluated, according also to the procedure of Example 1. Results of the evaluation are shown in Table 1.

EXAMPLE 5

Rubber particles are prepared according to the procedure of Example 1, except that a different hydrogenated block SBR (tetrablock structure, molecular weight 52,000, styrene content 40%, degree of hydrogenation 99% or more) is used as a starting rubber. The obtained rubber particles are found to have a number average particle size of about 0.25 μm, gel content of 66%, and Tg of −70° C. and are confirmed to have a micro-phase separating concentric multilayered structure. (The latex obtained in this case is referred to as latex B.)

In the same manner as in Example 1, a polymer powder is recovered from latex B and 10 parts of this powder is blended with 90 parts of the PPE resin. The thus obtained resin composition, upon property evaluation in the same manner, was found to have very high impact strength. Results of the evaluation are shown in Table 1.

EXAMPLE 6

10 parts of a rubber powder prepared according to the procedure of Example 1 is blended with 90 parts of the polystyrene resin and properties of the obtained resin composition are evaluated in the same manner as in Example 1. Results of the evaluation are shown in Table 1.

EXAMPLE 7

Rubber particles are prepared according to the procedure of Example 1, except that 1.2 parts of dicumyl peroxide is added instead of 2.0 parts thereof. The gel content of these rubber particles is 10%. A resin composition containing these rubber particles is prepared and its properties are evaluated, according also to the procedure of Example 1. Results of the evaluation are shown in Table 1.

EXAMPLE 8

Rubber particles are prepared according to the procedure of Example 1, except that a different hydrogenated block SBR (triblock structure, molecular weight 45,000, styrene content 30%, degree of hydrogenation 100%) is used as a starting rubber. The obtained rubber particles are found to have a number average particle size of about 0.25 μm, gel content of 60%, and Tg of −70° C. and are confirmed to have a micro-phase separating concentric multilayered structure.

According also to the procedure of Example 1, a resin composition is prepared and its properties are evaluated. Results of the evaluation are shown in Table 1.

EXAMPLE 9

10 parts of a rubber powder prepared according to the procedure of Example 1 is blended with 90 parts of the polyphenylene ether resin and properties of the obtained resin composition are evaluated in the same manner as in Example 1. Results of the evaluation are shown in Table 1.

EXAMPLE 10

A resin composition was prepared and its properties are evaluated, according to the procedure of Example 1, except that in the step of kneading and pelletizing the resin blend, 10 parts of styrene monomer is added to the blend and this mixture is kneaded and pelletized through a vacuum-vent extruder. Results of the evaluation are shown in Table 1. It is also found that the addition of styrene monomer has the effect of improving flow properties of the resin blend.

EXAMPLE 11

A polystyrene (molecular weight 200,000) latex prepared by emulsion polymerization is blended with such an amount of the rubber latex prepared in Example 1 so as to give a rubber-to-polystyrene ratio by weight of 10:10. A resin powder is recovered from the blended latex in the same manner as in Example 1, and 20 parts of this powder is blended with 80 parts of the PEE resin. Properties of the obtained resin composition are evaluated in the same manner as in Example 1. Results of the evaluation are shown in Table 1.

EXAMPLE 12

A resin composition is prepared and its properties are evaluated, according to the procedure of Example 11, except that the rubber latex is replaced by the same latex as used in Example 5. Results of the evaluation are shown in Table 1.

EXAMPLES 13-16

Using rubbers having properties as shown in Table 1, resin compositions were prepared and their properties are evaluated, according to the procedure of Example 5. Results of the evaluation are shown in Table 1. Rubber particles prepared in each of these examples showed a micro-phase separating concentric multilayered structure.

COMPARATIVE EXAMPLE 1

Latex A prepared in the same manner as in Example 1 is maintained at 135° C. for 3 hours to cross-link the rubber. Cyclohexane is stripped from this latex under a vacuum of 30 cmHg at 80° C., thereby reducing the amount of solvent from 70 parts (initial amount) to 1 part. The obtained rubber particles are found to have a number average particle size of about 0.25 μm, gel content of 83%, and Tg of −70° C. and are confirmed by electron microscopic observation to have no micro-phase separating concentric multilayered structure that is defined before.

According to the procedure of Example 1, a resin composition is prepared and its properties are evaluated. Results of the evaluation are shown in Table 1, revealing that this resin composition is inferior in both impact resistance and appearance, and that shock exertion of molded articles of this composition causes some separations of rubber particles from the matrix resin.

COMPARATIVE EXAMPLE 2

According to the procedure of Example 1, except that pellets of hydrogenated block SBR (the same as used in Example 1, tetrablock structure, molecular weight 46,000, styrene content 30%, degree of hydrogenation 99% or more) are used as such, a resin composition is prepared and its properties are evaluated. Results of the evaluation as shown in Table 1, revealing that this resin composition is inferior in impact resistance, and that shock exertion on molded articles of the composition causes remarkable separations of rubber particles from the matrix resin.

COMPARATIVE EXAMPLE 3

Preparation of rubber particles 30 parts of a block SBR (tetrablock structure, molecular weight 43,000, styrene content 35%, degree of hydrogenation 0%) and 0.3 part of 1,1-di-tert-butyl-peroxy-3,3,5-trimethylcyclohexane (tradename PERHEXA 3M, made by Nippon Yushi Co., Ltd.) are dissolved in 70 parts of cyclohexane. Subsequently, 4 parts of potassium rosinate and 6 parts of deionized water are added to the resulting solution and mixed uniformly. Further a high-speed shear force is exerted on this mixture in a homomixer to form an emulsion in dope form. To this emulsion is added 74 parts of deionized water to prepare a latex.

Then cyclohexane is stripped from this latex under a vacuum of 30 cmHg while maintaining the latex at 80° C., thereby reducing the solvent content from 70 parts (initial content) to 1 part.

Then the latex is maintained at 110° C. for 3 hours to cross-link the rubber. The thus obtained rubber particles are found to have a number average particle size of about 0.25 μm, gel content of 93%, and Tg of −70° C. and are confirmed by electron microscopic observation to have a micro-phase separating concentric multilayered structure.

According to the procedure of Example 1, a resin composition is prepared and its properties are evaluated. Results of the evaluation are shown in Table 1. While the molded specimens did not show the peeling of rubber particle from the matrix resin as caused by shock, the impact strength of the specimens is inferior and after their weather resistance test, these specimens showed a low impact strength retention of 70%.

COMPARATIVE EXAMPLE 4

According to the procedure of Example 1, except that pellets of block SBR (tetrablock structure, molecular weight 43,000, styrene content 35%, degree of hydrogenation 0%) are used as such, a resin composition is prepared and its properties are evaluated. Results of the evaluation are shown in Table 1. During the kneading-pelletizing, burning of the resin blend occurred, worsening the color of pellets.

COMPARATIVE EXAMPLE 5

According to the procedure of Example 5, except that pellets of the hydrogenated block SBR (tetrablock structure, molecular weight 52,500, styrene content 40%, degree of hydrogenation 99% or more) are used as such, a resin composition is prepared and its properties are evaluated. Results of the evaluation are shown in Table 1.

COMPARATIVE EXAMPLE 6

According to the procedure of Example 6 but using pellets of hydrogenated block SBR (tetrablock structure, molecular weight 46,000 styrene content 30%, degree of hydrogenation 99% or more), a resin composition is prepared and its properties are evaluated. Results of the evaluation are shown in Table 1.

COMPARATIVE EXAMPLE 7

25 parts of a block SBR (triblock structure, molecular weight 50,000, styrene content 30%, degree of hydrogenation 0%) and 0.25 part of 1,1-di-tert-butyl-peroxy-3,3,5-trimethylcyclohexane (PERHEXA 3M) are dissolved in 75 parts of benzene. Subsequently, a solution of 3 parts of sodium dodecylbenzenesulfonate and 0.83 part of nonylphenylethylene oxide in 2 parts of deionized water is added to the former solution and mixed uniformly. Further a high-speed shear force is exerted on this mixture in a homomixer to form an emulsion in dope form.

Then, benzene is stripped from this emulsion under a vacuum of 40 cmHg while maintaining the emulsion at 80° C., thereby reducing the solvent content from 75 parts (initial content) to 1 part. Thereafter this emulsion is maintained at 110° C. for 2.5 hours to cross-link the rubber. The obtained rubber particles are found to have a broad particle size distribution, number average particle size of 0.8 μm, gel content of 65%, and Tg of −70° C. and were confired by electron microscopic observation to have a micro-phase separating concentric multilayered structure.

According to the procedure of Example 1, a resin composition is prepared and its properties are evaluated. Results of the evaluation are shown in Table 1. Molded specimens of the resin composition showed slight peeling of rubber particle from the matrix resin and low impact strength. These specimens, after their weather resistance test, also showed a low impact strength retention of 68%. In addition, during the kneading-pelletizing, burning of the resin blend occurred, worsening the color of pellets.

Results, summarized in Table 1, of evaluating properties of the resin compositions prepared in Examples 1-16 and Comparative Examples 1-7 have confirmed that the resins of Examples 1-16 reinforced with hydrogenated rubber particles having gel fractions of at least 10% and a micro-phase separating concentric multilayered structure are superior in impact strength, surface gloss, and weather resistance to the resins of Comparative Examples 1 and 3, reinforced with rubber particles having no micro-phase separating concentric multilayered structure; the resins of Comparative Examples 2,4,5 and 6, reinforced by kneading with pellets of rubbers which are not cross-linked and have no gel fraction; and the resin of Comparative Example 7, reinforced with rubber particles which have a micro-phase separating concentric multilayered structure but are not hydrogenated; and that none of molded articles of resin compositions of Examples 1-16 show the peeling of rubber particle from the matrix resin caused by shock.

As the occasion demands, the reinforced resin composition of the present invention may contain common additives such as flame retardants, antioxidants and antistatic agents.

(2) When the thermoplastic resin is polycarbonate

Methods for measuring (i) gel content, (ii) impact strength, (iii) surface gloss, (iv) peeling of rubber particle from matrix resin caused by shock, and (v) average particle size of rubber are the same as in the case (1) where polyphenylene ether or polystyrene is used as a matrix resin.

(vi) Heat distortion temperature Measured in according with ASTM D-648.

EXAMPLES 17-19 AND COMPARATIVE EXAMPLES 8 AND 9

A polycarbonate resin (product of reacting bisphenol A with phosgen, molecular weight 30,000) and rubber particles are blended together in varying ratios as shown in Table 2, and the blends are each kneaded and pelletized through a twin-screw extruder at a resin temperature of 280° C. Pellets from each blend are injection-molded at a cylinder temperature of 280° C. and a mold temperature of 80° C. to form property-test specimens. Table 2 shows results of measuring the Izod impact strength and heat distortion temperature of these specimens. Blending rubber particles of the present invention not only improves the impact resistance of polycarbonate resin but also exhibits the effect of reducing the thickness-dependence of impact strength, which is a disadvantage of polycarbonate resin. While conventional rubber reinforcements for polycarbonate resin purposes involve the problems of lowering the heat resistance and the peeling of rubber particle from the matrix resin as caused by shock in molded articles of reinforced resin compositions, it has become possible by using rubber particles of the present invention to solve these problems substantially.

2. Preparation and Evaluation of Rubber-Reinforced Thermosetting Resin Compositions The present invention is explained referring to the following Examples of the production of resin compositions reinforced by blending epoxy-resins with rubber particles of the invention.

REFERENTIAL EXAMPLE 1

A resin powder is prepared in the same manner as in Example 1 by using the same latex B as used in Example 5. This resin powder is referred to as powder A.

REFERENTIAL EXAMPLE 2

To 75.0 parts (as rubber) of the same latex B as used in Example 5 are added 1.0 part of a phenolic antioxidant and 25.0 parts of a finely divided epoxy resin [a powder of 4-μm average particle size prepared by jet-milling a bisphenol A type epoxy resin having an epoxy equivalent of 675 (tradename AER 662H, made by Asahi Chemical Industry Co., Ltd.)], and are mixed uniformly in a homomixer. Then 1.0 part of aluminum sulfate is added to the mixture to salt out the rubber and resin, which are then recovered with dehydrating and hot-air dried at 70° C., yielding a homogeneous polymer powder (powder B).

REFERENTIAL EXAMPLE 3

A homogeneous polymer powder (powder C) is prepared according to the procedure of Referential Example 2, except that 50 parts of the finely divided epoxy resin is added to 50 parts (as rubber) of latex B.

REFERENTIAL EXAMPLE 4

A homogeneous polymer powder (powder D) is prepared according to the procedure of Referential Example 2, except that 75 parts of the finely divided epoxy resin to 25 parts (as rubber) of latex B.

EXAMPLE 20

A powder coating material (1) of 30- to 60-μm particle sizes is prepared from 100 parts of AER 662 mentioned above, 4 parts of dicyandiamide, 0.2 part of 2-methylimidazole, 25 parts of titanium oxide, 0.5 part of AEROSIL 380 (tradename, made by Nippon Aerosil Co., Ltd.), 0.3 part of a blow modifier, and 10 parts of powder A prepared in Referential Example 1, by dry blending them together, kneading the blend by a kneader (tradename COKNEADER PR-46, made by Buss Ltd.), and cooling and grinding the kneaded mass.

Kneading conditions were as follows:

| | |
|---|---|
| Cylinder temperature: | 90° C. |
| Die temperature: | 100° C. |
| Screw revolution: | 80 rpm (water-cooled) |

This powder coating material (1) is applied on a zinc phosphate treated steel sheet by using an electrostatic coater (supplied by SAMES Co.), and placing the coated sheet in a hot-air circulating type of oven of 200° C. for 20 minutes to form a coat 100 μm thick. Results of evaluating properties of this coat are shown in Table 3.

Properties of the coat are evaluated in the following ways:

The DuPont impact strength test and the checker-like cutting adhesion test are conducted in accordance with JIS K5400.

The Ericksen value is determined by using an Ericksen cupping tester and measuring the length of the portion of punch pushed in as far as the coat in cracked.

The Tg is represented by the temperature where the gradient of linear expansion coefficient-temperature curve changes notably.

The termal-degradation resistance is judged by visual observation of the appearance of the coat which has been left standing in an oven of 200° C. for 3 hours.

EXAMPLE 21

According to the procedure of Example 20 but adding 20 parts of powder A, a powder coating material was prepared and a coat is formed therefrom. Properties of the coat are shown in Table 3.

EXAMPLE 22

According to the procedure of Example 20 but adding 30 parts of powder A, a powder coating material was prepared and a coat is formed therefrom. Properties of the coat are shown in Table 3.

EXAMPLE 23

According to the procedure of Example 20 but adding 93.3 parts of AER 662H and 26.7 parts of powder B, a powder coating material is prepared and a coat is formed therefrom. Properties of the coat are shown in Table 3.

EXAMPLE 24

According to the procedure of Example 20 but adding 80 parts of AER 662H and 40 parts of powder C, a powder coating material is prepared and a coat is formed therefrom. Properties of the coat are shown in Table 3.

EXAMPLE 25

According to the procedure of Example 20 but adding 40 parts of AER 662H and 80 parts of powder D, a powder coating material is prepared and a coat is formed therefrom. Properties of the coat are shown in Table 3.

COMPARATIVE EXAMPLE 10

According to the method of Example 20, a powder coating material is prepared from 100 parts of AER 662H, 4 parts of a dicyandiamide, 0.2 part of 2-methylimidazole, 25 parts of titanium oxide, 0.5 part of AEROSIL 380, and 0.3 part of the flow modifier and a coat is formed from the powder coating material. Properties of the coat are shown in Table 3.

COMPARATIVE EXAMPLE 11

According to the method of Example 20, a powder coating material is prepared from 100 parts of AER 662H, 20 parts of a powder formed from HYCAR CTBN 1300×13 (tradename of carboxy-modified, nitrile-terminated butadiene rubber made by Ube Kosan Co., Ltd.) by melt-mixing followed by coarse grinding, 4 parts of dicyandiamide, 0.2 part of 2-methylimidazole, 0.5 part of AEROSIL 380, 0.3 part of the flow modifier, and 25 parts of titanium oxide and a coat is formed from the powder coating material. Properties of the coat are shown in Table 3.

EXAMPLE 26

100 Parts of AER 331 (tradename of bisphenol A type epoxy resin, epoxy equivalent 189, made by Asahi Chemical Industry Co., Ltd.) and 10 parts of powder A, prepared in Reference Example 1, are kneaded by using a 3-roll mill. This kneaded composition is mixed with 12 parts of triethylenetetramine to prepare a compound (1). Measurements of tensile lap-shear strength and T-peel strength are made on compound (1). Results of measurements are shown in Table 4. Test specimens are formed in the following manner:

Test specimens for the tensile lap-shear strength are prepared each by polishing two soft steel sheets (1.6 mm thick and 25 mm wide) defined in JIS G3141 with an abrasive of #100, applying compound (1) on one of the sheets, overlaping these sheets so that the adhesion area might be 3 cm$^2$, and placing the overlaped sheets in a hot-air circulating type oven of 80° C. for 30 minutes. On the thus prepared test specimens, the measurement is made in accordance with JIS K6850. For the T-peel strength 0.2-mm thick aluminum foils are polished with an abrasive of #100 and thereafter test specimens are prepared and the measurement is made, in accordance with JIS K6854. The curing in this case is conducted under the same conditions as in the case of the test for the tensile lap-shear strength.

EXAMPLE 27

A compound (2) is prepared by kneading 100 parts of AER 331 and 20 parts of powder A using a 3-roll mill, and adding 12 parts of triethylenetetramine. On test specimens formed from compound (2), measurements of tensile lap-shear strength and T-peel strength are made according to the procedure of Example 26. Results of the measurements are shown in Table 4.

EXAMPLE 28

A compound (3) is prepared by kneading 100 parts of AER 331 and 30 parts of powder A using a 3-roll mill, and adding 12 parts of triethylenetetramine. According to the procedure of Example 26, compound (3) is formed into coats and their tensile lap-shear strength and T-peel strength are measured. Results of the measurement are shown in Table 4.

EXAMPLE 29

100 parts of AER 331 and 20 parts of powder A are kneaded by using a 3-roll mill. To this kneaded mixture are added 85 parts of HN-2200 (tradename of methyltetrahydroxyphthalic anhydride made by Hitachi Chemical Co., Ltd.) and 0.5 part of benzyldimethylamine. Similarly to the procedure of Example 26, coats are formed by applying the above prepared compound and curing the applied compound at 100° C. for 2 hours and then at 150° C. for 3 hours, and the tensile lap-shear strength and T-peel strength of the coats are measured. Results of the measurements are shown in Table 4.

EXAMPLE 30

100 parts of AER 331 and 20 parts of powder A are kneaded by using a 3-roll mill, and 3 parts of 2-methylimidazole is added to the kneaded mixture. Similarly to the procedure of Example 26, coats are formed by applying the above prepared compound and curing the applied compound at 100° C. for 2 hours, and the tensile lap-shear strength and T-peel strength of the coats are measured. Results of the measurements are shown in Table 4.

EXAMPLE 31

100 parts of AER 331 and 20 parts of powder A are kneaded by using a 3-roll mill, and further 3 parts of piperazine is mixed with the kneaded composition. Similarly to the procedure of Example 26, coats are formed by applying the above prepared compound and curing the applied compound at 100° C. for 2 hours, and the tensile lap-shear strength and T-peel strength of the coats are measured. Results of the measurements are shown in Table 4.

COMPARATIVE EXAMPLE 12

100 parts of AER 331 and 12 parts of triethylene tetramine, mixed together, are formed into coats in the same manner as in Example 23, and the tensile lap-shear strength and T-peel strength of the coats are measured. Results of the measurements are shown in Table 4.

COMPARATIVE EXAMPLE 13

100 parts of AER 331, 85 parts of HN-2200, and 0.5 part of benzyldimethylamine, mixed together, are formed into coats in the same manner as in Example 29, and the tensile lap-shear strength and T-peel strength of the coats are measured. Results of the measurements are shown in Table 4.

COMPARATIVE EXAMPLE 14

100 parts of AER 331 and 3 parts of 2-methylimidazole, mixed together, are formed into coats in the same manner as in Example 30, and the tensile lap-shear strength and T-peel strength of the coats are measured. Results of the measurements are shown in Table 4.

COMPARATIVE EXAMPLE 15

100 parts of AER 331 and 3 parts of piperazine, mixed together, are formed into coats in the same manner as in Example 31, and the tensile lap-shear strength and T-peel strength of the coats are measured. Results of the measurements are shown in Table 4.

COMPARATIVE EXAMPLE 16

100 parts of AER 331, 20 parts of HYCAR CTBN 1300×13, and 12 parts of triethylenetetramine, mixed together, are formed into coats in the same manner as in Example 26, and the tensile lap-shear strength and T-peel strength of the coats are measured. Results of the measurements are shown in Table 4.

EXAMPLE 32 AND COMPARATIVE EXAMPLE 17

Epoxy resin compositions for transfer molding are prepared by adding powder A in different amounts as shown (by parts to 100 parts of the epoxy resin) in Table 5 to the following composition (1):

| | |
|---|---|
| AER 273 (tradename of cresol Novolak epoxy resin, epoxy equivalent 212, supplied by Asahi Chemical Industry Co., Ltd.) | 80 parts |
| AER HBR 755 (tradename of tetrabromobisphenol A diglycidyl ether, Br content 48 wt %, epoxy equivalent 460, supplied by Asahi Chemical Industry Co., Ltd) | 20 parts |
| 2-Ethyl-4-methylimidazole | 2 parts |
| Antimony trioxide | 6 parts |
| Carnauba wax | 2 parts |
| Carbon black | 1 part |
| γ-Glycidoxypropyltrimethoxysilane | 1 part |
| Silica powder | 450 parts, | then adding 53.8 parts of a phenol Novolak resin, mixing the resulting mixtures separately in a mixer, further kneading them separately in a cokneader (supplied by Buss Co.) (kneading conditions: cylinder temperature 90° C., die temperature 100° C., screw (water cooled) revolution 80 rpm), followed by cooling and grinding.

Using each epoxy resin composition thus obtained, electronic components for tests are encapsulated by transfer molding (170° C., for 2 minutes). Further the moldings are cured at 170° C. for 12 hours, and subjected to tests for heat cycle resistance and moisture resistance. Characteristic values shown in Table 5 are evaluated in the following ways:

(1) Heat cycle resistance

IC lead frames of the 16-pin DIP type (I land size 4×7.5 mm) are encapsulated with each composition by transfer molding. These flames are dipped in a liquid of −196° C. for 30 seconds and then in a liquid of +150° C. for 30 seconds. After repeating of these dipping operations, the frequency of crack development at the surfaces of molded capsules, are examined. The frequency of crack development is represented by the number of IC chips, the molded capsules of the chips been cracked, per 100 IC chips, that is, the percentage of moldings cracked.

(2) Moisture resistance

Aluminum-wired silicon chips having no passivation film are set in IC lead frames of the 16-pin DIP type. These assemblies are encapsulated with each composition by transfer molding under the conditions stated above, and are left standing under the environmental conditions of 120° C. and 100% R.H. After definite times, the corrosion state of aluminum wirings is examined. The result of the moisture resistance test is expressed in terms of the number of chips, the aluminum wirings of the chips are defective due to corrosion, per 100 chips.

Results of the above examples (Examples 20–32) have proved that the epoxy resin composition according to the present invention provides coatings improved in film strength, impact resistance and thermal-degradation resistance as well as adhesive coats improved in shear strength and peel strength, and further that the present composition, when used for the encapsulation of electronic components, has low stress and exhibits improved heat cycle resistance and moisture resistance.

TABLE 1

| | Character of rubber | | | | | | |
|---|---|---|---|---|---|---|---|
| | Type of block structure (1) | Molecular weight | Styrene content (%) | Micro-phase separating structure (2) | Gel content | Particle size | Degree of hydrogenation (%) |
| Example 1 | Type 4 | $4.6 \times 10^4$ | 30 | (b) | 83 | 2500 | >99 |
| Example 2 | " | $4.6 \times 10^4$ | 30 | (b) | 60 | 2500 | >99 |
| Example 3 | " | $4.6 \times 10^4$ | 30 | (b) | 25 | 2500 | >99 |
| Example 4 | " | $4.6 \times 10^4$ | 30 | (b) | 83 | 8000 | >99 |

TABLE 1-continued

| | | | | | | | |
|---|---|---|---|---|---|---|---|
| Example 5 | " | 5.2 × 10⁴ | 40 | (c) | 66 | 2500 | >99 |
| Example 6 | " | 4.6 × 10⁴ | 30 | (b) | 83 | 2500 | >99 |
| Example 7 | " | 4.6 × 10⁴ | 30 | (b) | 10 | 2500 | >99 |
| Example 8 | Type 3 | 4.5 × 10⁴ | 30 | (b) | 60 | 2500 | 100 |
| Example 9 | Type 4 | 4.6 × 10⁴ | 30 | (b) | 60 | 2500 | >99 |
| Example 10 | " | 5.2 × 10⁴ | 40 | (c) | 72 | 2500 | >99 |
| Example 11 | " | 4.6 × 10⁴ | 30 | (b) | 83 | 2500 | >99 |
| Example 12 | Type 4 | 5.2 × 10⁴ | 40 | (c) | 69 | 2500 | >99 |
| Example 13 | " | 5.0 × 10⁴ | 50 | (c) | 64 | 2500 | >99 |
| Example 14 | " | 10.0 × 10⁴ | 40 | (c) | 65 | 2500 | >99 |
| Example 15 | " | 5.6 × 10⁴ | 50 | (c) | 66 | 2500 | >99 |
| Example 16 | " | 5.6 × 10⁴ | 60 | (c) | 64 | 2500 | >99 |
| Comparative Example 1 | Type 4 | 4.6 × 10⁴ | 30 | (a) | 83 | 2500 | >99 |
| Comparative Example 2 | " | 4.6 × 10⁴ | 30 | Pellets | 0 | — | >99 |
| Comparative Example 3 | " | 4.3 × 10⁴ | 35 | (a) | 93 | 2500 | 0 |
| Comparative Example 4 | " | 4.3 × 10⁴ | 35 | Pellets | 0 | — | 0 |
| Comparative Example 5 | " | 5.2 × 10⁴ | 40 | Pellets | 0 | — | >99 |
| Comparative Example 6 | " | 4.6 × 10⁴ | 30 | Pellets | 0 | — | >99 |
| Comparative Example 7 | Type 3 | 5.0 × 10⁴ | 30 | (b) | 65 | 2500 | 0 |

| | Resin composition evaluated (parts by weight) | | | ¼ IZOD (kgcm/cm) | GLOSS (%) | Pelling of rubber particles as caused by shock | Weather resistance retention of impact strength |
|---|---|---|---|---|---|---|---|
| | Rubber | PS | PPE | | | | |
| Example 1 | 10 | 30 | 60 | 25 | 90 | No | 82% |
| Example 2 | 10 | 30 | 60 | 24 | 80 | " | — |
| Example 3 | 10 | 30 | 60 | 23 | 46 | " | — |
| Example 4 | 10 | 30 | 60 | 26 | 90 | " | — |
| Example 5 | 10 | 0 | 90 | 37 | 98 | " | — |
| Example 6 | 10 | 90 | 0 | 10 | 99 | " | — |
| Example 7 | 10 | 30 | 60 | 20 | 35 | " | — |
| Example 8 | 10 | 30 | 60 | 22 | 78 | " | — |
| Example 9 | 10 | 0 | 90 | 36 | 88 | Slightly occurred | — |
| Example 10 | 10 | 0 | 90 SM 10 | 30 | 95 | No | — |
| Example 11 | 10 | Emulsion 10 | 80 | 32 | 96 | " | — |
| Example 12 | 10 | Emulsion 10 | 80 | 22 | 96 | No | — |
| Example 13 | 10 | 0 | 90 | 25 | 95 | " | — |
| Example 14 | 10 | 0 | 90 | 21 | 96 | " | — |
| Example 15 | 10 | 0 | 90 | 22 | 95 | " | — |
| Example 16 | 10 | 0 | 90 | 20 | 96 | " | — |
| Comparative Example 1 | 10 | 30 | 60 | 13 | 23 | Observed | — |
| Comparative Example 2 | 10 | 30 | 60 | 14 | 75 | Remarkable | — |
| Comparative Example 3 | 10 | 30 | 60 | 10 | 84 | No | 70% |
| Comparative Example 4 | 10 | 30 | 60 | 8 | 80 | Remarkable | — |
| Comparative Example 5 | 10 | 0 | 90 | 15 | 100 | " | — |
| Comparative Example 6 | 10 | 90 | 0 | 3 | 100 | " | — |
| Comparative Example 7 | 10 | 0 | 90 | 16 | 84 | Slightly occurred | 68% |

(1) Type 3: triblock structure; Type 4: tetrablock structure
(2) (a) Irregular micro-phase separating structure
(b) Intermittent, micro-phase separating concentric multilayered structure
(c) Continuous, micro-phase separating concentric multilayered structure

TABLE 2

| | Character of rubber | | | | | | |
|---|---|---|---|---|---|---|---|
| | Type of block structure (1) | Molecular weight | Styrene content (%) | Micro-phase separating structure (2) | Gel content | Particle size | Degree of hydrogenation (%) |
| Example 17 | Type 4 | 4.6 × 10⁴ | 30 | (b) | 60 | 2500 | >99 |
| Example 18 | " | 4.6 × 10⁴ | 30 | (b) | 60 | 2500 | >99 |
| Example 19 | " | 5.2 × 10⁴ | 40 | (c) | 66 | 2500 | >99 |
| Comparative Example 8 | — | — | — | — | — | — | — |

TABLE 2-continued

| | | | | | | | Peeling of rubber particles as caused by shock | HDT (°C.) |
|---|---|---|---|---|---|---|---|---|
| Comparative Example 9 | Type 4 | 4.6 × 10⁴ | 30 | Pellet | 0 | — | | >99 |

| | Resin composition evaluated (parts by weight) | | ¼ IZOD (kgcm/cm) | ⅛ IZOD (kgcm/cm) | Peeling of rubber particles as caused by shock | HDT (°C.) |
|---|---|---|---|---|---|---|
| | Rubber | Polycarbonate | | | | |
| Example 17 | 10 | 90 | 30 | 22 | Slightly occurred | 132 |
| Example 18 | 15 | 85 | 45 | 26 | Slightly occurred | 128 |
| Example 19 | 10 | 90 | 44 | 25 | No | 132 |
| Comparative Example 8 | — | 100 | 28 | 14 | " | 135 |
| Comparative Example 9 | 10 | 90 | 29 | 17 | " | 127 |

Note (1), (2): The same in Table 1.

TABLE 3
Results of Coating Film Evaluation

| | Example 20 | Example 21 | Example 22 | Example 23 | Example 24 | Example 25 | Comparative Example 10 | Comparative Example 11 |
|---|---|---|---|---|---|---|---|---|
| DuPont impact strength (¼ inch, 1 kg, cm) | 50< | 50< | 50< | 50< | 50< | 50< | 10 | 50 |
| Checker-like cutting adhesion test (1 mm) | 100/100 | 100/100 | 100/100 | 100/100 | 100/100 | 100/100 | 100/100 | 100/100 |
| Ericksen value (mm) | 7.7 | 8.2 | 8.7 | 8.2 | 8.3 | 8.3 | 6.0 | 8.0 |
| Tg (°C.) | 130 | 125 | 120 | 125 | 125 | 125 | 135 | 105 |
| Thermal-degradation resistance 200° C. × 3 hr | No change observed | No change observed | No change observed | No change observed | No change observed | No change observed | No change observed | Yellowing |
| DuPont impact strength after test for thermal-degradation resistance (¼ inch, 1 kg, cm) | 50< | 50< | 50< | 50< | 50< | 50< | 10 | 30 |

TABLE 4
Results of Adhesive Strength Measurement

| | Example | | | | | | Comparative Example | | | | |
|---|---|---|---|---|---|---|---|---|---|---|---|
| | 26 | 27 | 28 | 29 | 30 | 31 | 12 | 13 | 14 | 15 | 16 |
| Tensile lap-shear strength (kg/cm²) | 220 | 250 | 270 | 240 | 240 | 280 | 150 | 140 | 140 | 200 | 230 |
| T-peel strength (kg/cm) | 4 | 5 | 6 | 3 | 4 | 8 | 0.2 | 0.2 | 0.2 | 0.5 | 4 |
| After heating (200° C. × 3 hr) | | | | | | | | | | | |
| Tensile lap-shear strength (kg/cm²) | 210 | 230 | 250 | 240 | 220 | 270 | 140 | 130 | 135 | 180 | 150 |
| T-peel strength (kg/cm) | 4 | 5 | 5 | 3 | 4 | 8 | 0.1> | 0.1> | 0.1> | 0.1> | 1 |

TABLE 5

Results of Evaluating Electronic Component Encapsulating Characteristics

| | Example | | | Comparative Example | | |
|---|---|---|---|---|---|---|
| | 32-1 | 32-2 | 32-3 | 17-1 | 17-2 | 17-3 |
| ingredient | | | | | | |
| Composition (1) | 562 | 562 | 562 | 562 | 562 | 562 |
| Phenol Novolak resin | 53.8 | 53.8 | 53.8 | 53.8 | 53.8 | 53.8 |
| Powder A | 10 | 20 | 30 | — | — | — |
| Hycar CTBN [1] | — | — | — | — | 10 | — |
| Styrene-butadiene rubber | — | — | — | — | — | 10 |
| Performance Characteristic | | | | | | |
| Heat cycle resistance | | | | | | |
| 50 cycle | 0 | 0 | 0 | 20 | 10 | 10 |
| 200 cycle | 2 | 0 | 0 | 100 | 40 | 30 |
| Moisture resistance | | | | | | |
| 500 hr. | 0 | 0 | 0 | 10 | 30 | 25 |
| 1000 hr. | 8 | 6 | 3 | 30 | 60 | 50 |
| 2000 hr. | 25 | 20 | 10 | 100 | 100 | 90 |

Note
[1] Carboxy-terminated, liquid butadiene nitrile resin (Ube Kosan Co., Ltd.)

What is claimed is:

1. Rubber particles comprising a hydrogenated block copolymer of a conjugated diene and a vinyl aromatic compound, said particles having a glass transition temperature of $-30°$ C. or less, a gel content of at least 10%, an average particle size of 0.01 to 5.0 $\mu$m, and a micro-phase separating structure having hard segments and soft segments, wherein the hard segments and soft segments are alternately laminated together in the form of concentric multilayers.

2. The rubber particles of claim 1, wherein the gel content is in a range of from 40 to 95%.

3. The rubber particles according to claim 1, wherein the average particle size is in a range of from 0.1 to 2.0 $\mu$m.

4. The rubber particles according to claim 1, wherein the amount of the vinyl aromatic compound is in a range of from 30 to 70% by weight.

5. The rubber particles according to claim 1, wherein the block structure is of a triblock type or tetrablock type.

6. The rubber particles according to claim 1, wherein the degree of hydrogenation of the hydrogenated block copolymer is at least 30%.

7. The rubber particles according to claim 1, wherein the hard segments of the hydrogenated block copolymer consist of polystyrene and the soft segments consist of hydrogenated polybutadiene.

8. The rubber particles according to claim 7, wherein the gel content is in a range of from 40 to 95%.

9. The rubber particles according to claim 7, wherein the average particle size is in a range of from 0.1 to 2.0 $\mu$m.

10. The rubber particles according to claim 7, wherein the amount of bound styrene is in a range of from 30 to 70% by weight.

11. The rubber particles according to claim 7, wherein the block structure is of a triblock type or tetrablock type.

12. The rubber particles according to claim 7, wherein the degree of hydrogenation of the hydrogenated block copolymer is at least 30%.

13. Rubber particles consisting essentially of a hydrogenated block copolymer consisting essentially of a conjugated diene and from 30 to 70% by weight of a vinyl aromatic compound, wherein the degree of hydrogenation is at least 30%, said particles having a glass transition temperature of $-30°$ C. or less, a gel content of at least 10%, an average particle size of 0.01 to 5.0 $\mu$m, and a micro-phase separating structure having hard segments and soft segments, wherein the hard segments and soft segments are alternately laminated together in the form of concentric multilayers.

14. The rubber particles of claim 13, wherein the gel content is in a range of from 40 to 95%.

15. The rubber particles according to claim 13, wherein the average particle size is in a range of from 0.1 to 2.0 $\mu$m.

16. The rubber particles according to claim 13, wherein the block structure is of a triblock type or tetrablock type.

17. The rubber particles according to claim 13, wherein the hard segments of the hydrogenated block copolymer consist of polystyrene and the soft segments consist of hydrogenated polybutadiene.

18. The rubber particles according to claim 17, wherein the gel content is in a range of from 40 to 95%.

19. The rubber particles according to claim 17, wherein the average particle size is in a range of from 0.1 to 2.0 $\mu$m.

20. The rubber particles according to claim 17, wherein the block structure is of a triblock type or tetrablock type.

* * * * *